July 21, 1970     H. R. KOENIG     3,521,189
MULTIPLE CRYSTAL HIGH POWER LASER DESIGN
Filed Jan. 3, 1967
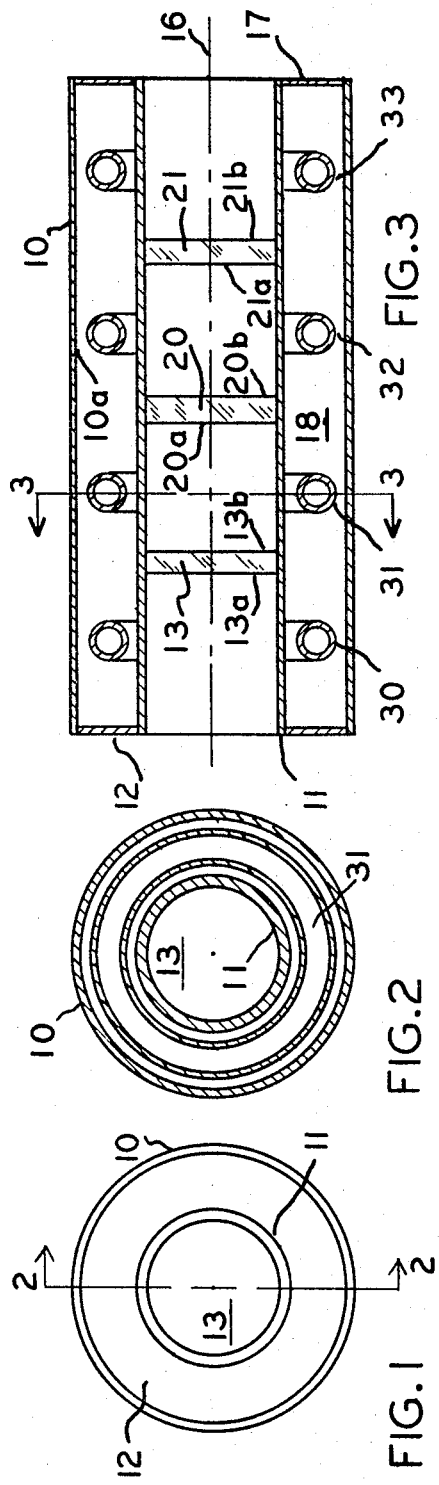
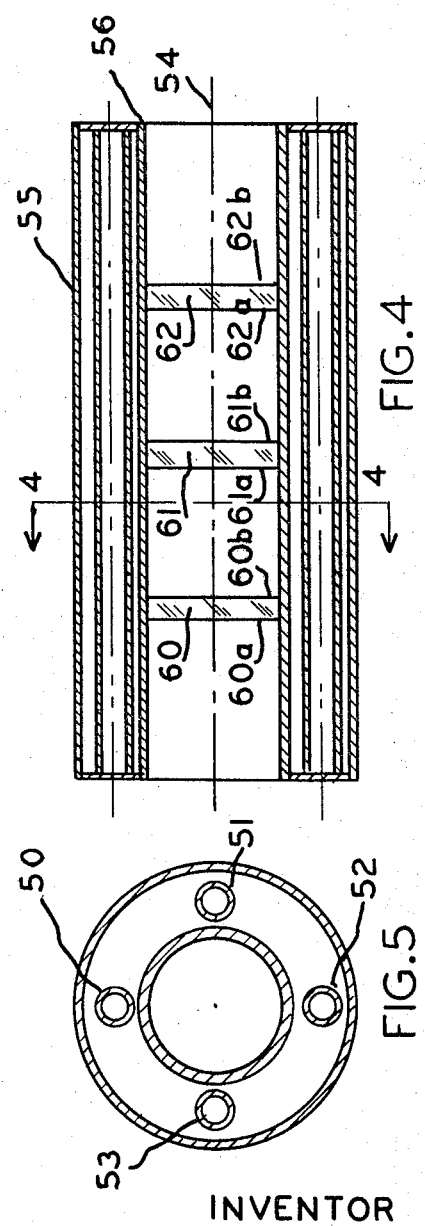
INVENTOR
HAROLD R. KOENIG
BY
*Richard J. Miller*
ATTY.

United States Patent Office 3,521,189
Patented July 21, 1970

3,521,189
MULTIPLE CRYSTAL HIGH POWER LASER DESIGN
Harold R. Koenig, Schenectady, N.Y., assignor, by mesne assignments, to the United States of America as represented by the Secretary of the Navy
Filed Jan. 3, 1967, Ser. No. 607,358
Int. Cl. H01s 3/00
U.S. Cl. 331—94.5                   5 Claims

ABSTRACT OF THE DISCLOSURE

This invention relates to a laser system and more particularly to a face pumped laser with an improved means for synchronous face pumping a plurality of spaced laser discs wherein the pump energy is filtered and diffused to pass only desired frequencies of electromagnetic radiation to the discs.

---

This invention relates to a laser system and more particularly to a face pumped laser device.

Since the discovery of laser and maser action there has been a continuous attempt to improve the operating characteristics of the individual types of devices used in such systems. One problem that has plagued the designer is that of obtaining means to place enough pumping energy in the material that is to lase to obtain a desired level of output. In the past it was customary to have the laser material formed into long relatively thin rods and to pump these generally cylindrical devices with radiation entering through the side walls from lamps along the major axis of the rod. It is obvious that energy which is to pump the material near the center must pass through the outer portion of the rod and by so doing can cause non-linear results such as distortion due to heating. This is particularly true when the device is being repeatedly fired.

This invention provides means to overcome these problems by providing a novel method of pumping the laser material. It is therefore an object of this invention to provide an improved pumping device.

Yet another object is to provide an improved method of face pumping a plurality of laser discs.

Still another object of this invention is to provide a means of synchronous face pumping a plurality of laser discs.

Yet a further object of this invention is to provide a device for face pumping a plurality of laser discs in synchronism wherein the pump energy is filtered and diffused to pass only desired pump bands of electromagnetic radiation to the discs.

And yet another object is to provide a device for face pumping a laser element comprising an annular housing having a major longitudinal axis; a filter medium of cylindrical shape within said housing and disposed about the axis, first and second end members holding the housing and filter in a fixed relationship, a disc shaped laser element having first and second faces positioned within the filter normal to the axis, means including a flash lamp positioned between the housing and the filter for generating a light pulse capable of pumping the disc above the threshold value, wherein the majority of the pump light passes through the filter and into the disc element through the faces.

Another object of this invention is to provide a laser device, comprising: a housing comprising a hollow cylindrical member having a reflective inner surface and two planar end members each provided with an aperture therethrough the end members disposed transverse to the longitudinal axis of the cylindrical member; a hollow cylindrical filter media positioned within the housing and connected to the end members thereof for maintaining a coaxial relationship between the housing cylindrical member and filter media; a relatively short cylindrically shaped solid material capable of lasing when pumped above threshold and having relatively large first and second end surfaces, the material positioned within the filter media for maintaining alignment of the first and second end surfaces with the housing apertures; and pump means positioned between the housing cylindrical member and the filter media to provide pump energy through the media and the first and second end surfaces of the material to pump the material above the threshold value.

A further object of this invention is to provide a laser device comprising a hollow housing having a reflective inner surface disposed along a first axis; first and second end members individually having an aperture therethrough affixed to the housing; a hollow filter media positioned in the housing along the axis, and maintained in a co-axial relationship within said housing; means, including a member, capable of lasing when pumped above threshold, having a thickness dimension less than the width dimension, the material having relatively large first and second end surfaces; and pumped means positioned between housing and the filter media to provide pump energy to the material through the first and second end surfaces of the material.

Other objects, advantages and novel features of the invention will become apparent from the following detailed description of the invention when considered in conjunction with the accompanying drawings wherein:

FIG. 1 is an end view of a cylindrical housing incorporating one embodiment of the invention;
FIG. 2 is a sectional view along lines 3—3 in FIG. 3;
FIG. 3 is a sectional view along lines 2—2 in FIG. 1;
FIG. 4 is a sectional view of a second embodiment of the invention; and
FIG. 5 is a sectional view along lines 4—4 in FIG. 4.

The end view shown in FIG. 1 includes a housing member 10, annular inner filter member 11, a first end spacer member 12 and a laser disc 13.

FIG. 3 shows housing member 10 to be generally of cylindrical shape and is disposed along an axis 16. In a like manner the filter member 11 is cylindrical and generally coaxially aligned with member 10, end member 12 and second end member 17 rigidly affixed the coaxial relationship between member 10 and filter 11 and define therewith a closed volume 18.

Within filter 11 there are three laser discs 13, 20 and 21 shown for the purpose of this description to be disc shaped and having their major faces normal to axis 16. These discs are shown as right cylinders whose diameter is larger than its height thus placing the ends or planar faces parallel and close to each other.

It is understood that these laser discs 13, 20, and 21 may be mounted such that the face 13a, 13b, 20a, 20b, 21a, and 21b may intersect the axis 16 at some angle between 90° and the Brester angle for that laser material.

Within volume 18 between the filter 11 and member 10 are disposed four sources of pumping light 30, 31, 32, and 33. These are actuated and supported by means not shown to generate electromagnetic radiation including the pumping frequencies of the laser that pass through filter 11 into laser members 13, 20 and 21. The pass band of the filter is such that it will pass the pumping bands but is opaque at the emitting frequency of the laser material.

To improve the distribution of light within volume 18 the iner face 10a of housing member 10 is constructed to be a diffusing surface. It is readily apparent that a majority of the pumping light enters the laser members 13, 20 and 21 through the major faces 13a, 13b, 20a, 21a, and 21b and sufficient energy reaches discs 13, 20 and 21 to elevate the discs above the threshold value.

FIGS. 4 and 5 show a different configuration of the device wherein the four flash lamps 50, 51, 52, and 53 are disposed such that their longitudinal axes are parallel to axis 54 of housing 55 and filter 56. Three laser discs 60, 61 and 62 receive the majority of pumping light through the selective filter 56 through the majority faces 60a, 60b, 61a, 61b, 62a and 62b. It is obvious that additional configurations of lamps, such as a heliacally wound flash lamp may be used.

Obviously many modifications and variations of the present invention are possible in the light of the above teachings. It is therefore to be understood that within the scope of the appended claims the invention may be practiced otherwise than as specifically described.

I claim:
1. A laser device, comprising:
   (a) a hollow housing having a reflective inner surface disposed along a first axis;
   (b) first and second end members individually having an aperture therethrough affixed to said housing;
   (c) a hollow filter media positioned in said housing along said axis and maintained in a coaxial relationship within said housing by said end members;
   (d) means, including a member, capable of lasing when pumped above threshold, having a thickness dimension less than the width dimension, said material having relatively large first and second end surfaces; and
   (e) pump means positioned between housing and said filter media to provide pump energy to said material through said first and second end surfaces of said material.

2. The device of claim 1 wherein said housing and filter media are cylindrical in shape.

3. The device of claim 2 wherein said means capable of lasing includes a plurality of discs shaped members spaced along said axes in said filter media.

4. The device of claim 1 wherein said filter media is transparent to pump energy from said pump means and opaque to radiant energy in the frequency spectrum outside the pump bands.

5. The device of claim 3 wherein said plurality of members capable of lasing are positioned within said filter media at an angle with said axes between the Brewster angle and the normal.

References Cited

UNITED STATES PATENTS

| | | | |
|---|---|---|---|
| 3,423,693 | 1/1969 | Chernoch et al. | 131—94.5 |
| 3,423,697 | 1/1969 | Chernoch | 331—94.5 |
| 2,929,922 | 3/1960 | Schawlow et al. | 250—7 |
| 3,136,959 | 6/1964 | Culver. | |
| 3,311,846 | 3/1967 | Simpson et al. | 331—94.5 |

FOREIGN PATENTS 1,200,946  9/1965  Germany.

RONALD L. WIBERT, Primary Examiner

P. K. GODWIN, Jr., Assistant Examiner